(12) United States Patent
Grove

(10) Patent No.: US 9,140,394 B1
(45) Date of Patent: Sep. 22, 2015

(54) INTAKE MANIFOLD ASSEMBLY FOR STORAGE TANKS

(76) Inventor: Don Kevin Grove, Grand Junction, CO (US)

( * ) Notice: Subject to any disclaimer, the term of this patent is extended or adjusted under 35 U.S.C. 154(b) by 198 days.

(21) Appl. No.: 13/416,306

(22) Filed: Mar. 9, 2012

(51) Int. Cl.
*F16L 17/00* (2006.01)
*F16L 39/00* (2006.01)

(52) U.S. Cl.
CPC ................... *F16L 39/005* (2013.01)

(58) Field of Classification Search
USPC .............. 285/124.3, 124.4, 18, 61, 120.1; 403/111, 325; 248/222.52, 221.11, 248/225.21, 229.14; 220/565, 567.2, 567.1, 220/86.1; 141/346–347, 367, 375, 383–385
See application file for complete search history.

(56) References Cited

U.S. PATENT DOCUMENTS

| | | | | |
|---|---|---|---|---|
| 2,198,418 | A | * | 4/1940 | Snow ............................. 137/579 |
| 2,528,369 | A | * | 10/1950 | Jensen ........................... 285/179 |
| 2,845,965 | A | * | 8/1958 | Rittenhouse ................... 141/207 |
| 3,807,465 | A | * | 4/1974 | Ginsburgh et al. ............ 141/346 |
| 4,083,135 | A | * | 4/1978 | van den Brink et al. ........ 37/336 |
| 5,072,845 | A | | 12/1991 | Grogan |
| 5,816,423 | A | | 10/1998 | Fenton et al. |
| 6,199,910 | B1 | | 3/2001 | Wade |
| 6,375,222 | B1 | | 4/2002 | Wade |
| 7,997,623 | B2 | | 8/2011 | Williams |
| 2010/0032435 | A1 | | 2/2010 | Satterfield et al. |
| 2011/0006068 | A1 | | 1/2011 | Kaupp |

* cited by examiner

*Primary Examiner* — Aaron Dunwoody
(74) *Attorney, Agent, or Firm* — The Reilly Intellectual Property Law Firm, P.C.

(57) ABSTRACT

An intake manifold assembly for storage tanks comprises a pair of fill tubes joined together in side-by-side relation to a common mounting plate with spring latches at opposite ends of the mounting plate for releasable connection to an inlet on the tank such that the fill tubes are mounted at a predetermined angle to the inlet, a float assembly is attached to the manifold assembly to measure the liquid level in the tank, and a net assembly extends over the inlet to prevent entry of foreign matter into the tank.

13 Claims, 8 Drawing Sheets

INTAKE MANIFOLD ASSEMBLY FOR STORAGE TANKS

BACKGROUND AND FIELD OF INVENTION

This invention relates to storage tanks and, more particularly, a frac tank utilized to store liquids for use in oil and gas well drilling operations and to a novel and improved manifold assembly for filling and maintaining a predetermined level of liquid in each tank. Typically, frac tanks of the type described are mobile and designed to be transported by a tractor or trailer to the drilling site; and customarily will require an entire battery of storage tanks. Typically, each tank has a capacity of 500 barrels or more and has a liquid inlet hose line extending to an opening in the top surface of each tank.

In the past, a customary way of facilitating the connection of each inlet hose has been to attach the hose to a pipe extending above the roof or top portion of the tank or, in the case of intake openings which are flush with the roof, it was necessary to drop the delivery hose into the opening. In either situation, it was not possible to fill the tank to a specific level and prevent possible overflow. Also it presented the risk of the hose flying out of the opening under high water pressure and risking injury to the workmen but, in any case, would require close attention during the course of filling the tank. Accordingly, there is a need for a manifold with connector assembly that addresses the above and other drawbacks in filling storage tanks and does so in such a way as to permit filling the tank at a much higher rate while minimizing the risk of injuries and spills associated with the filling process.

SUMMARY OF INVENTION

It is therefore an object of the present invention to provide for a novel and improved manifold assembly for storage tanks which enables installation of one or more delivery hoses to the existing inlet opening and in such a way as to achieve the following:
1. One-handed secure installation;
2. No tools required for installation;
3. Manifold installs in under 30 seconds;
4. Uses industry standard releasable hose connections;
5. Manifold tube angle and mitered ends allow user to see flow into tank and prevents water splashing out as tank reaches maximum capacity;
6. Low profile design allows multiple tanks to be filled in low volume situations;
7. Design allows fill tube ends to be 99 percent submerged without risk of siphoning back;
8. Tanks can be safely filled at much higher rates;
9. Can be used with either one or two hoses;
10. Eliminates spills and injuries associated with hoses "kicking" out of tanks;
11. High visibility reflective float mounted on hose connection allows rising rank levels to be monitored without walking tank to tank in dark, slick or adverse weather conditions;
12. A mesh cover or net is designed to be used with or without manifold to prevent entry of animals or foreign matter.
13. Net allows hoses to stay "rigged up" to tanks and still comply with migratory bird statutes; prevents injuries because tanks no longer have to be constantly "rigged up" and then "rigged back down".

In one aspect of the invention, the manifold assembly is comprised of a pair of fill tubes joined together in side-by-side relation to a common mounting plate, a first spring latch at one end of the mounting plate extends beneath one edge of the inlet, a second spring latch at an opposite end of the mounting plate is movable into engagement with an intermediate support member in the opening so as to mount the lower ends of the fill tubes at a predetermined angle to the inlet and with the opposite ends of the fill tubes extending substantially horizontally in spaced relation to the opening for releasable connection of each of the hoses to the opposite ends of the fill tubes.

In another aspect of the invention, a float assembly is mounted for inward extension for a predetermined distance below the inlet to measure the liquid level in the tank as it is being filled.

In still another aspect of the invention, a net assembly is releasably secured to the manifold for extension over the inlet to prevent the entry of rodents, bird life or foreign matter into the space between the fill tubes and outer edges of the inlet.

The above and other objects, advantages and features of this invention will become more readily appreciated and understood from a consideration of the following detailed description when taken together with the accompanying drawings in which:

DETAILED DESCRIPTION OF THE DRAWINGS

FIG. 7A is an enlarged view in detail of one of the spring latches; and

Need to make reference to float mount shown in some of the views and fabric mesh or net assembly.

DETAILED DESCRIPTION OF FIRST EMBODIMENT

Figure 1:
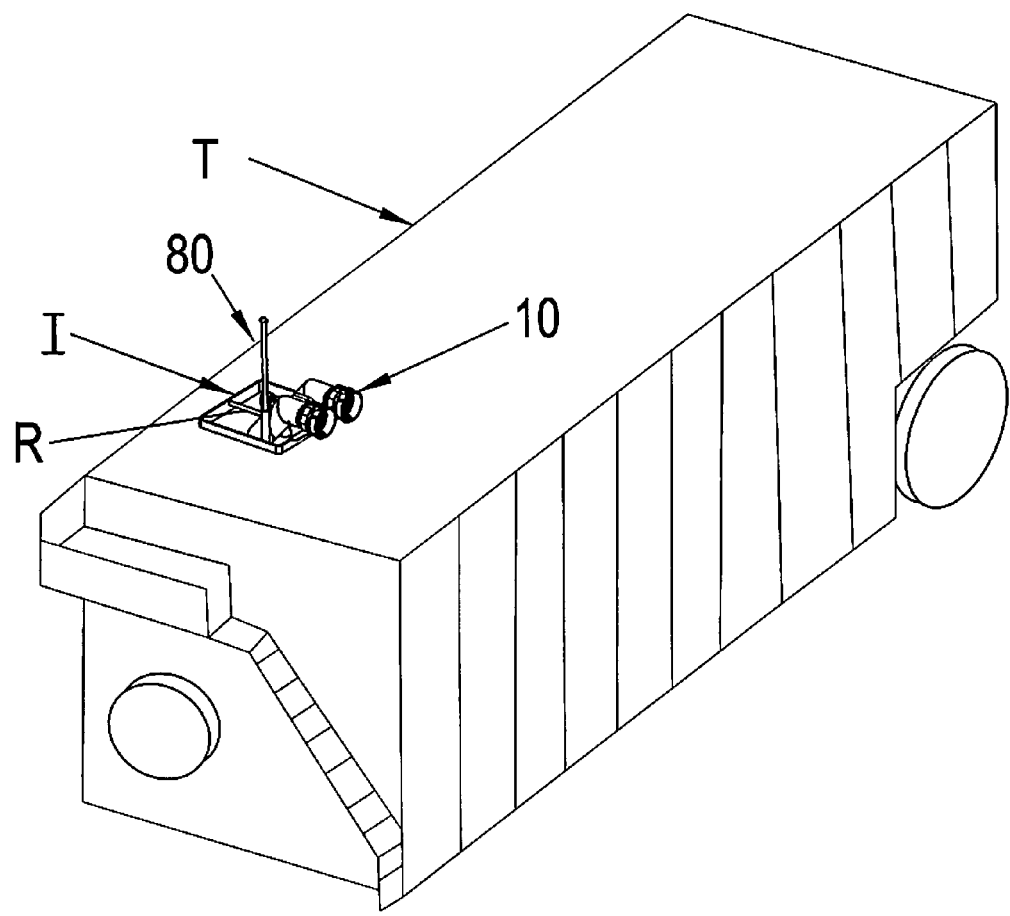
FIG. 1 is a perspective view of a standard frac tank illustrating the releasable hose connector assembly of the present invention mounted for extension into an upper hose inlet on the tank.
Figure 2:
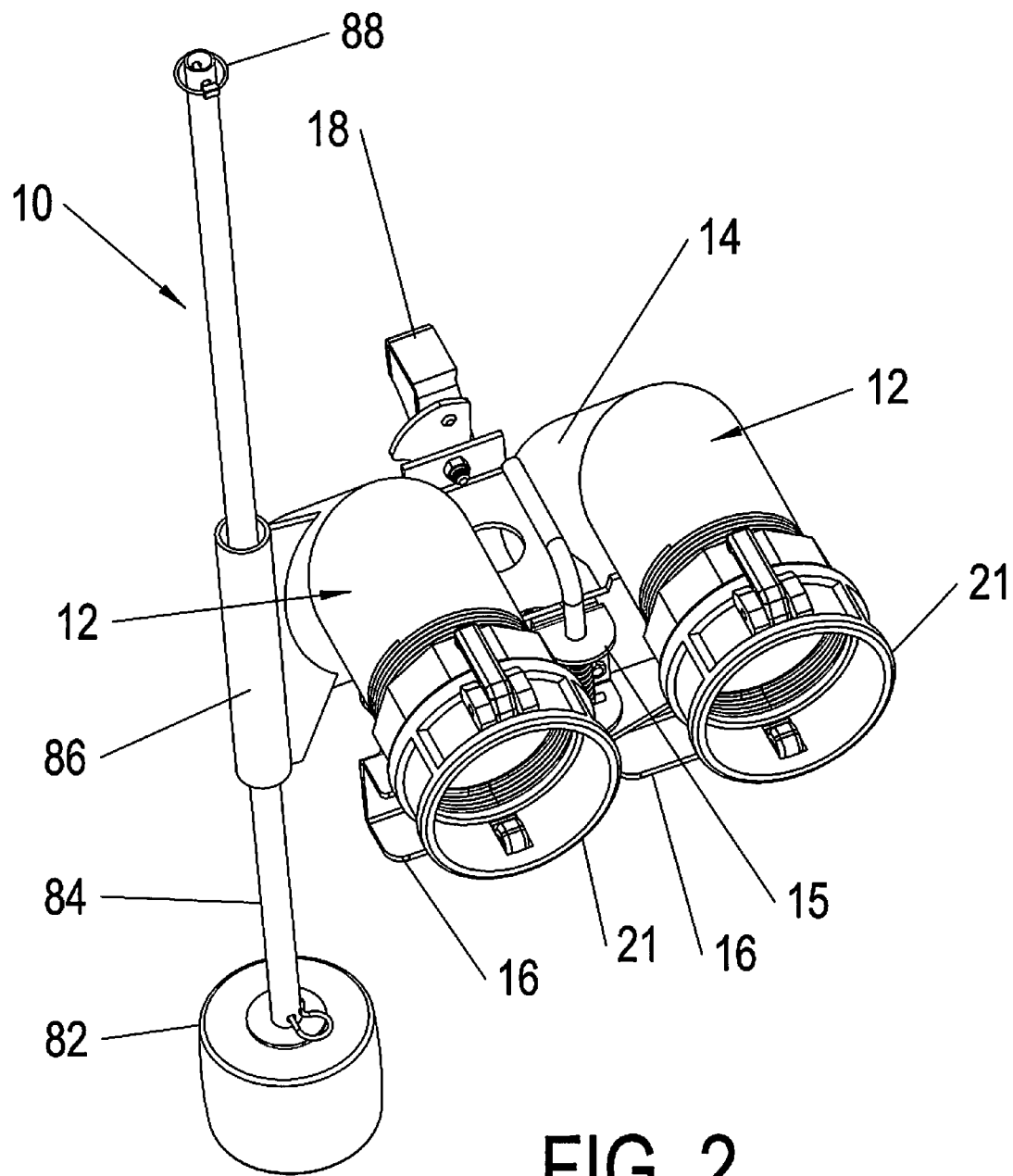
FIG. 2 is a front perspective view of one embodiment of a hose connector assembly including a mesh cover in accordance with the present invention.

There is shown by way of illustrative example in FIGS. 1-8 a first embodiment of a manifold assembly 10 and, as a setting for the embodiment described, FIG. 1 illustrates the manifold assembly 10 mounted on an inlet I of a frac tank T. As alluded to earlier, the frac tank T may be one of a number of frac tanks which are mounted in rows or batteries in an oil field with liquid inlet hoses H extending to each tank and releasably connected singly or in pairs for delivery of liquid into each tank T. Although not shown, each tank T is provided with an exhaust hose for delivery of the liquid to a drilling site.

Figure 4:
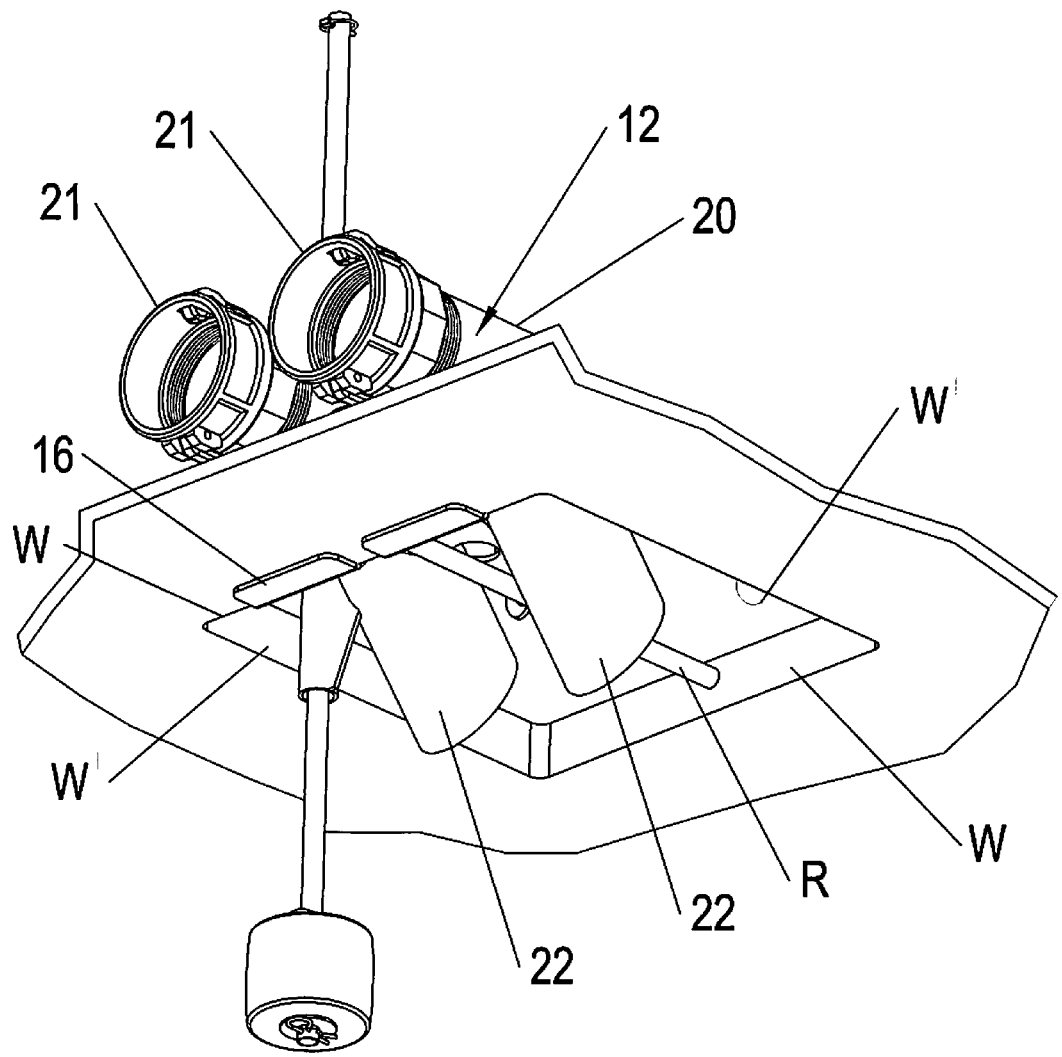
FIG. 4 is a perspective view of the first embodiment taken from beneath the inlet.
Figure 5:
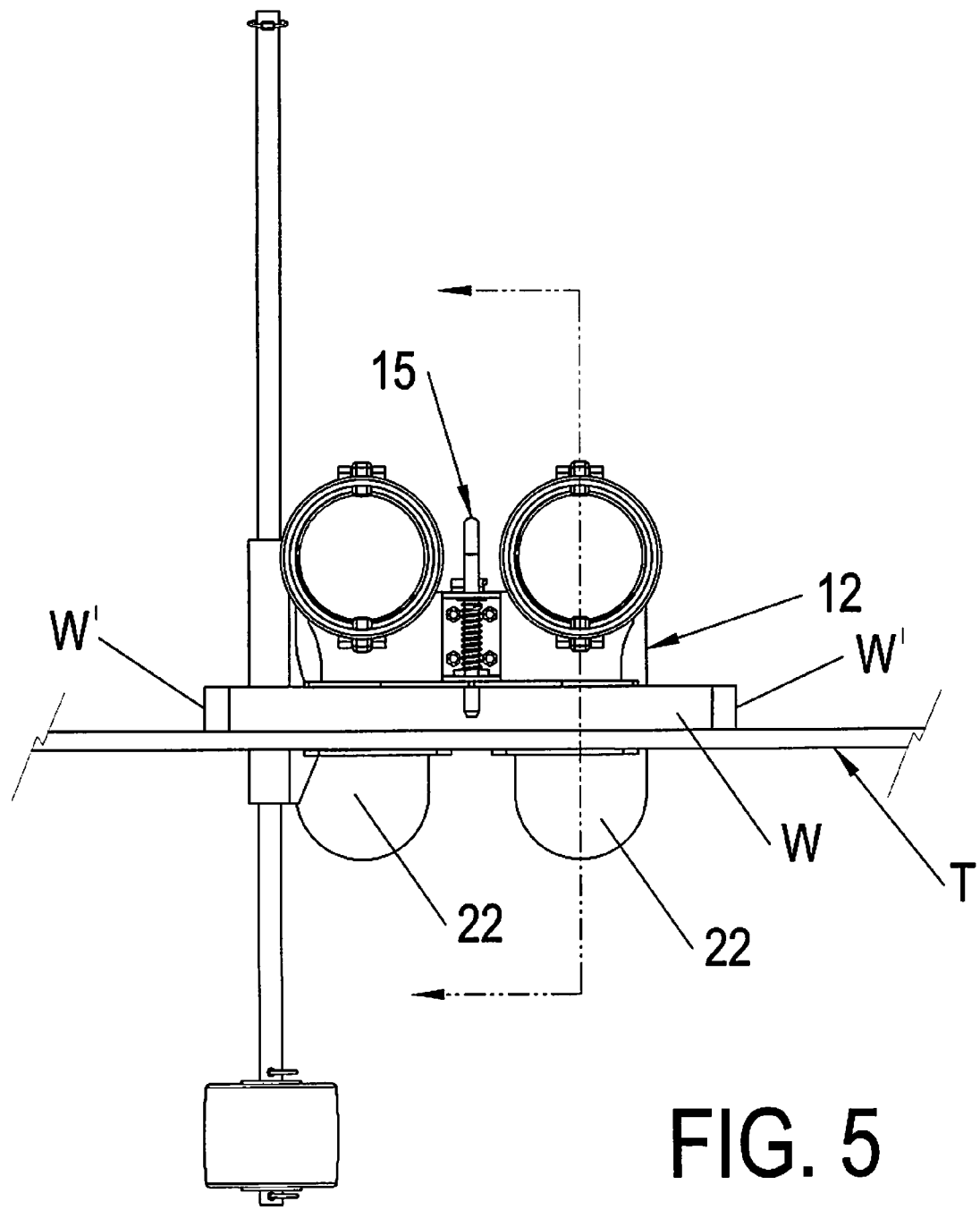
FIG. 5 is a side view in elevation of one of the fill tubes releasably mounted on the inlet and illustrating connection of the delivery hose to the external end of the fill tube.

In the embodiment shown in FIGS. 1-8, one such hose connection is illustrated in FIG. 5 and is hereinafter described in more detail.

Figure 3:
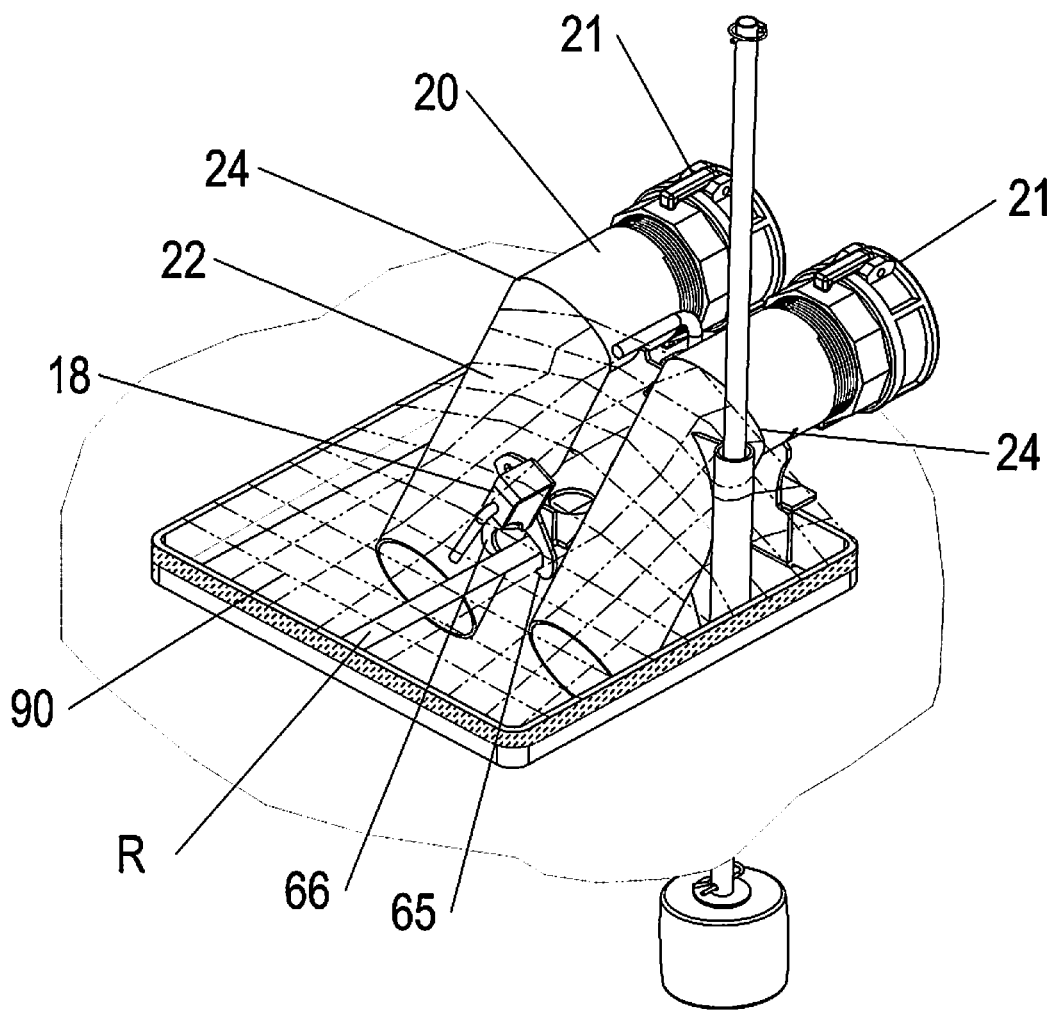
FIG. 3 is another rear perspective view of the first embodiment shown in FIG. 2.

As best seen from FIGS. 1, 3 and 4, the inlet I is of rectangular configuration with upstanding end walls W and opposite side walls W', but is merely illustrative of one inlet configuration. For example, the inlet may be circular and in which event a support rod R may be added or clamped in place if not already provided across the inlet.

In the embodiment shown, the manifold assembly 10 is broadly comprised of a pair of fill tubes 12 mounted in juxtaposed relation to one another on a common mounting plate 14. A first spring latch 15 at one end of the mounting plate 14 extends downwardly through the inlet and terminates in ledges 16 beneath one end wall W. A second spring latch 18 is mounted on the opposite end of the mounting plate for downward extension of a pair of spring-loaded scissors halves 65, 66 into surrounding relation to the rod R and cooperate with the first latch assembly 15 in releasably connecting the manifold assembly 10 to the inlet I. Each of the fill tubes 12 is of a diameter substantially corresponding to each of the hoses H, and each fill tube 12 is constructed of pipe sections 20 and 22 welded or otherwise permanently joined together at a mitered joint 24 so that the pipe section 22 inclines down from the horizontal section 20 into the inlet I, and the lower edge 26 of the pipe section 22 terminates just beneath the inlet opening so as to be visible to workmen standing on the top surface of the tank T. The end of each horizontal section 20 opposite to the mitered joint has a standard fitting 21 for a quick, releasable connection of the end of each hose. One such fitting is a Camlock fitting, such as, Part No. CF1000440 sold by Central States Hose Co., Denver, Colo.

Figure 6:
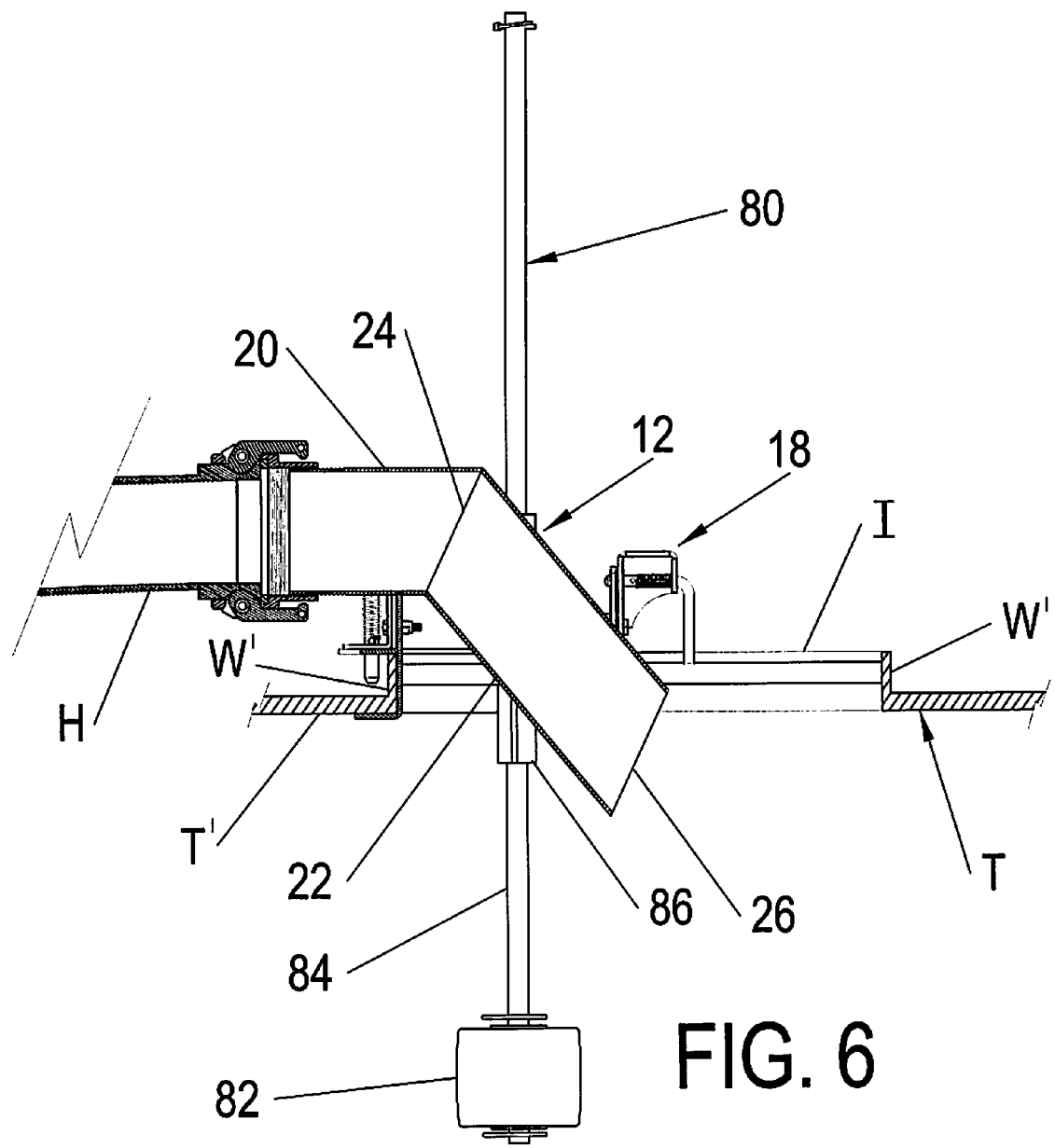
FIG. 6 is another side view partially in section of the first embodiment.
Figure 7:
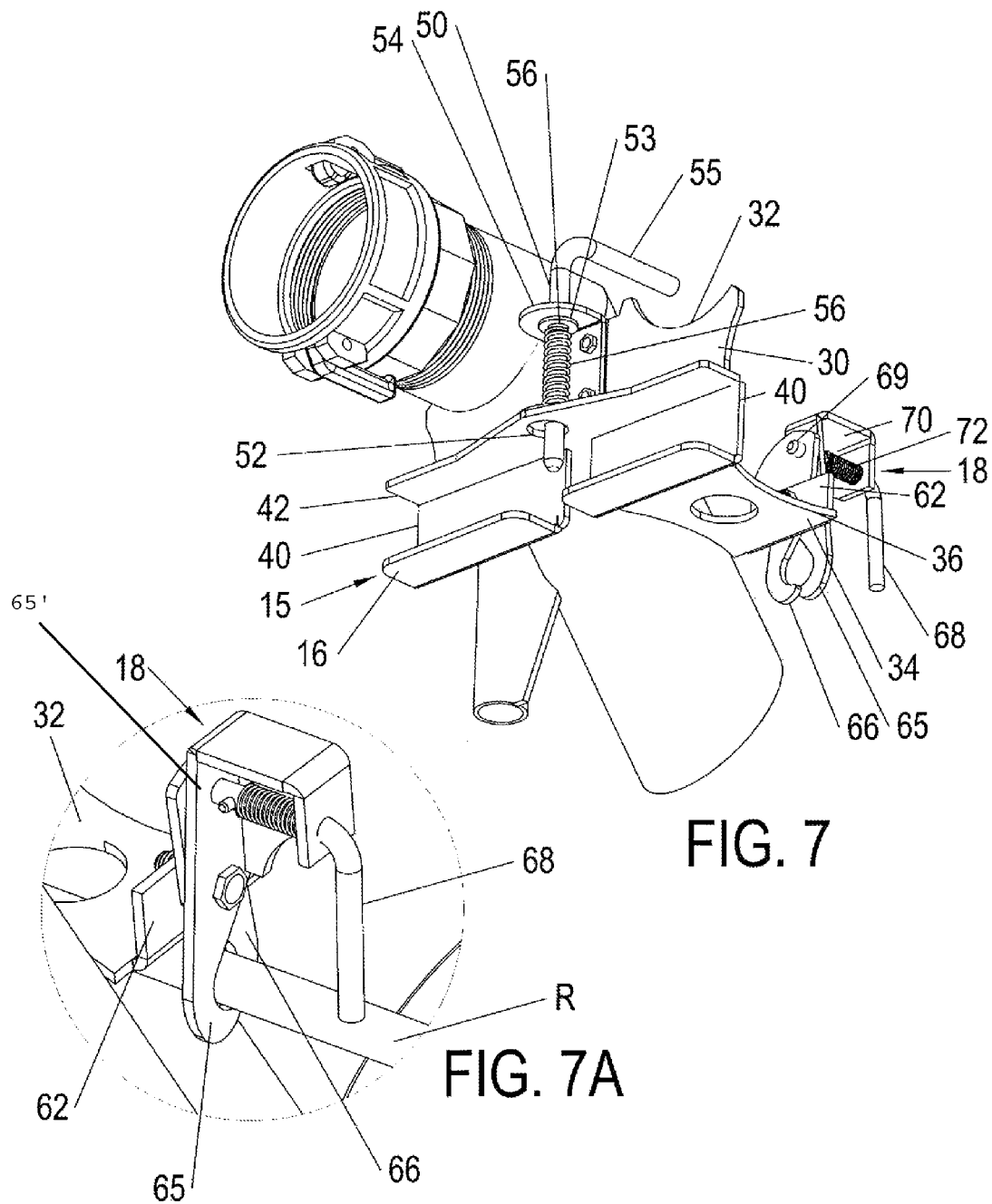
FIG. 7 is a side view in elevation of one of the fill tubes mounted on the inlet.
Figure 8:
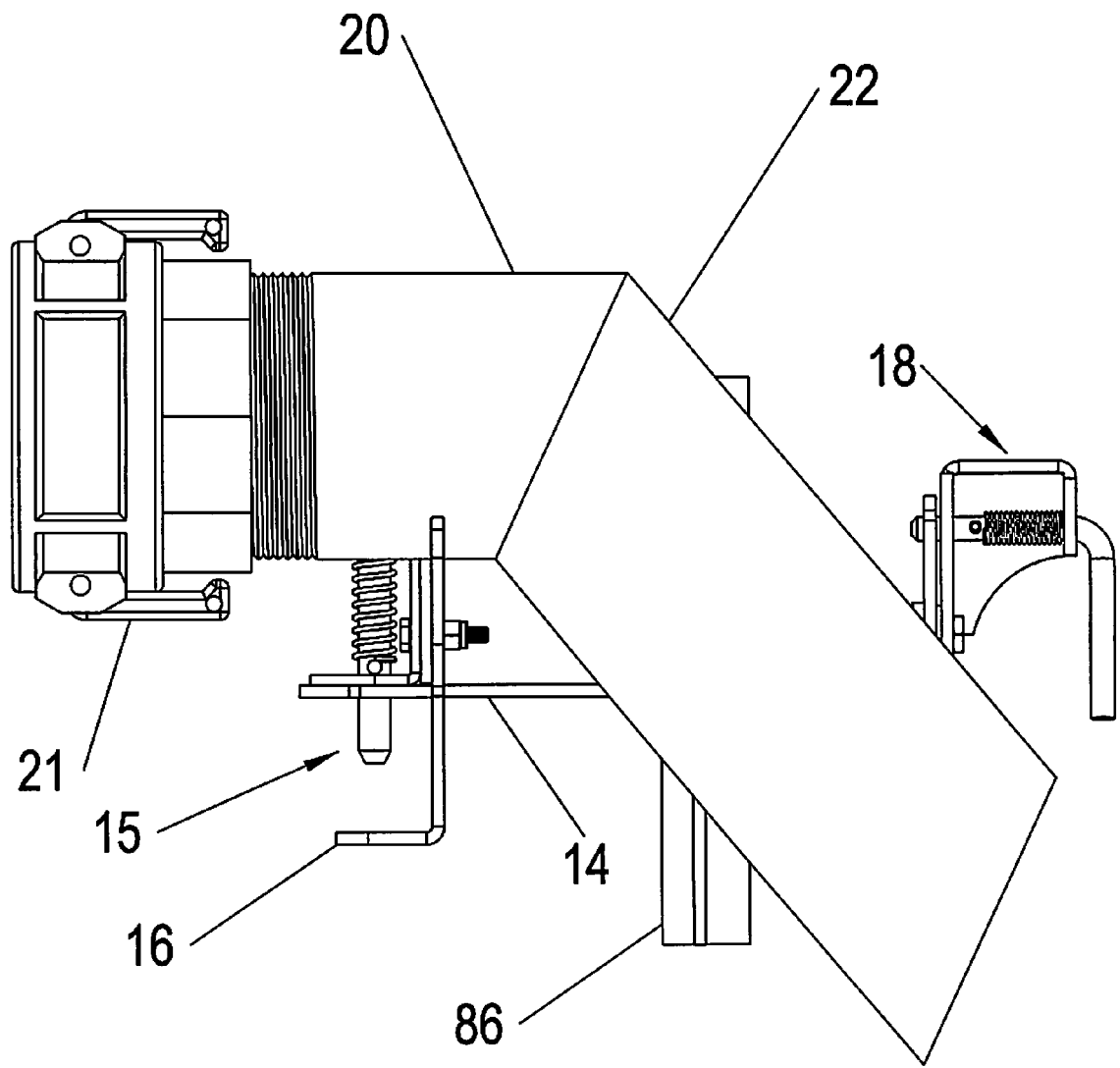
FIG. 8 is a side elevational view partially in section of the first embodiment.

In order to mount a pair of fill tubes 12 with attached hoses H in balanced, side-by-side relation to one another for extension of the inclined pipe sections 22 into the inlet, the mounting plate assembly 14, as best seen from FIG. 6-8, is made up of a vertical gusset plate 30 having a pair of upper concave edges 32 to conform to the curvature of and support the upper pipe sections 20; and a rearwardly extending horizontal gusset plate having opposed generally concave side edges 36 conform to the curvature of and are welded to the inclined pipe sections 22. Similarly, the upper edges 32 of the gusset 30 are welded to the pipes 20 thereby resulting in a unified mounting plate assembly.

As shown in FIGS. 6-8, the vertical gusset 30 terminates at its lower end in a pair of split, horizontal angle brackets 40 including the forwardly extending ledge portions 16 which are slidable into position beneath the end of wall W, as best seen from FIGS. 4 and 5. Upper split ledges 42 on the brackets 40 project forwardly from the gusset plate 30 spaced above the ledge portions 16 to rest on the top edge of the wall W and support the front end of the manifold assembly at the desired height and specifically to mount the upper fill hose sections for substantially horizontal extension in vertically spaced relation above the inlet I. The front spring latch assembly 15 also includes a pin 50 extending downwardly through aligned openings 51 and 52 in an upper support bracket 54 fixed to the vertical gusset 30 and the lower support bracket 42. The pin 50 includes a lever arm 55 at its upper end, and a compression spring 56 is mounted between the upper and lower support brackets 54 and 42 with a limit stop 53 at the upper end of the spring 56 so that the pin can be lifted manually via the lever arm 55 against the loading of the spring 56 to permit the upper and lower ledges 42 and 16 to overlap the support wall W. Following release of the lever 55, the lower end of the pin 50 is free to advance downwardly in front of the vertical support wall W into closely spaced relation to the horizontal surface of the tank as designated at T' in FIG. 5. In this way, the front end of the manifold assembly is loosely attached to the front support wall but prevented from accidental release either in a vertical or horizontal direction by the latch assembly 15.

As shown in FIGS. 3, 7 and 7a, the rear spring latch assembly 18 is mounted on an angle bracket 62 at the rearward end of the gusset 34 and is comprised of scissor halves 65 and 66. The upper end 65' of the half 65 is fixed to the bracket 62, and the other half 66 is pivotal with respect to the first half 65 under the control of a lever arm 68 which has a locking pin 69 at one end extending through a housing 70. The lever arm 68 is spring-loaded by a compression spring 72 inside of the housing 70 to normally urge the pin 69 to project forwardly through an opening in the upper end 65' of the fixed scissor half 65 in order to lock the pivotal scissor half 66 in the closed position shown in FIGS. 7 and 7a. By manually retracting the pin 69 away from the opening and swinging the housing 70 and lever 68 in a counterclockwise direction, the pivotal scissor half 66 is rotatable into the open position shown in FIG. 3.

From the foregoing, both spring-loaded latches 15 and 18 are manually accessible or engageable from a point above the fill tubes 12 and, by closing the scissors halves over the support rod R, will securely but releaseably attach the manifold assembly to the inlet I. The front latch assembly 15 is released by lifting the lever arm 55 until the pin 50 clears the support wall W in order to permit the upper and lower ledges of the support bracket 40 to be slid rearwardly away from the wall W, by retracting the lever arm 68 and pin 69 away from the scissors half 65, and the entire manifold assembly can then be lifted off of the inlet I.

In use, the hoses H can be connected to the manifold assembly either before or after the manifold assembly is mounted on the inlet I. A float assembly 80 is comprised of a standard float 82 attached to the lower end of a float rod 84 which is slidable through a float receiver tube 86 which is permanently affixed to the side of one of the inclined pipe sections 22 and secured against release by suitable lynch pin 88.

Another feature of the invention resides in a mesh or net cover 90 which is illustrated in FIG. 3, and can be placed over the inlet and upwardly protruding inclined pipe sections 22 and also extended beneath the horizontal sections 24 so as to completely cover the inlet. The cover 90 may be secured in tightly surrounding relation to the upper support walls W and W' by any suitable fabric or Velcro strips along the outside border of the net and, if desired, can be further secured by elastic rope extending around the outside edges of the net which overlap the walls W and W'.

There may be situations in which it is not necessary to utilize both of the latches 15 and 18 to secure the manifold to the inlet. For example, if there is no support rod R across the inlet I the manifold assembly can be secured to the inlet I only by the front latch 15. Nevertheless, if conditions should dictate, a support rod R may be added to the inlet, such as, by clamping in place in order to utilize both latches 15 and 18. Conversely, there may be situations in which it is necessary only to use the second latch 18 without the first latch 15.

Although a preferred embodiment is herein set forth and described, the above and other modifications and changes may be made therein as well as its intended application for uses other than frac tanks without departing from the spirit and scope of the invention as hereinafter claimed.

I claim:
1. A liquid storage tank assembly comprising;
   a frac tank having an upper generally rectangular liquid inlet provided with an intermediate support rod and one or more fill hoses for delivery of liquid under pressure into said inlet;

a manifold assembly having a hollow mounting plate disposed on said inlet and spring-loaded latches at opposite ends of said plate, one of said latches being releasably engagable with an edge of said liquid inlet and a second of said latches being releasably engagable with said support rod; and a pair of fill tubes mounted in juxtaposed relation to one another on opposite sides of said mounting plate, each of said fill tubes having a tubular end oriented at an angle to said inlet for inward extension therein when said latches are engaged with said edge of said liquid inlet.

2. A liquid storage tank assembly according to claim 1 wherein said latches are spring-loaded latches including a first edge engagement member movable into loose-fitting engagement with an edge of said inlet and a second scissors like member movable into encircling relation to said support rod.

3. A liquid storage tank assembly according to claim 1 wherein said first spring-loaded latch includes a ledge movable into loose-fitting engagement with said edge of said inlet.

4. A liquid storage tank system comprising a liquid storage tank having an upper liquid inlet provided with upper fixed portions and one or more liquid delivery hoses; and a manifold assembly comprising a mounting plate having latches releasably engagable with said upper fixed portions of said fluid inlet, at least one fill tube mounted on said plate, each said fill tube having a first tubular end orientated for inward extension into said inlet, and a second tubular end extending from said first tubular end externally of said tank, and each of said second tubular ends being releasably connectable to an end of one of said delivery hoses.

5. A liquid storage tank system according to claim 4 wherein said latches are spring-loaded latches including engagement members movable into engagement with said fixed portion of said inlet.

6. A liquid storage tank system according to claim 5 wherein one of said spring latches includes a bracket having a ledge movable beneath one end wall of said inlet.

7. A liquid storage tank system according to claim 5 wherein said engagement members are defined by scissors movable between an open position and a closed position in surrounding relation to a support rod extending across said inlet.

8. A liquid storage tank system according to claim 7 wherein a float member extends downwardly alongside one of said fill tubes for sensing the fluid level in said tank.

9. A liquid storage tank system according to claim 4 wherein a pair of said fill tubes are mounted in juxtaposed relation to one another on opposite sides of said mounting plate, said fill tubes being coextensive with one another, and said latches being mounted on said mounting plate between said fill tubes.

10. A liquid storage tank system according to claim 4 wherein a mesh cover is mounted on said inlet.

11. A liquid storage tank system comprising a storage tank having an upper inlet and one or more liquid delivery hoses, a hollow mounting plate disposed on said inlet, a pair of fill tubes mounted in juxtaposed relation to one another on opposite sides of said mounting plate, said fill tubes being coextensive with one another, and latches mounted on said mounting plate between said fill tubes, each said fill tube having a first tubular end oriented at an angle to said inlet for inward extension therein, and a second tubular end extending away from said first tubular end externally of said tank, each of said second tubular ends extending in spaced parallel relation to said inlet, and each said delivery hose releasably connected to an end of one of said second fill tubes opposite to said first tubular end.

12. A liquid storage tank system according to claim 11 wherein said latches are disposed at opposite ends of said mounting plate.

13. A liquid storage tank system according to claim 11 wherein a float member extends downwardly alongside one of said fill tubes for sensing the fluid level in said tank.

\* \* \* \* \*